US012567398B2

(12) United States Patent
Tandon et al.

(10) Patent No.: US 12,567,398 B2
(45) Date of Patent: Mar. 3, 2026

(54) SYSTEMS AND METHODS FOR PERFORMING VIDEO COMMUNICATION USING TEXT-BASED COMPRESSION

(71) Applicants: The Board of Trustees of the Leland Stanford Junior University, Stanford, CA (US); The Regents of the University of California, Oakland, CA (US); Massachusetts Institute of Technology, Cambridge, MA (US)

(72) Inventors: Pulkit Tandon, Sunnyvale, CA (US); Shubham Chandak, Stanford, CA (US); Pat Pataranutaporn, Stanford, CA (US); Yimeng Liu, Stanford, CA (US); Anesu M. Mapuranga, Stanford, CA (US); Patricia Emilia Maes, Stanford, CA (US); Tsachy Weissman, Stanford, CA (US); Misha Sra, Stanford, CA (US)

(73) Assignees: The Board of Trustees of the Leland Stanford Junior University, Stanford, CA (US); The Regents of the University of California, Oakland, CA (US); Massachusetts Institute of Technology, Cambridge, MA (US)

( * ) Notice: Subject to any disclaimer, the term of this patent is extended or adjusted under 35 U.S.C. 154(b) by 667 days.

(21) Appl. No.: 17/808,507

(22) Filed: Jun. 23, 2022

(65) Prior Publication Data

US 2022/0417291 A1     Dec. 29, 2022

Related U.S. Application Data

(60) Provisional application No. 63/214,195, filed on Jun. 23, 2021.

(51) Int. Cl.
    *G10L 13/02*       (2013.01)
    *G06T 13/40*       (2011.01)
                (Continued)

(52) U.S. Cl.
    CPC .............. *G10L 13/02* (2013.01); *G06T 13/40* (2013.01); *G10L 15/26* (2013.01); *H04L 65/403* (2013.01)

(58) Field of Classification Search
    CPC ......... G10L 13/02; G10L 15/26; G06T 13/40; H04L 65/403
    See application file for complete search history.

(56) References Cited

U.S. PATENT DOCUMENTS 6,177,928 B1 *   1/2001   Basso ............ H04N 21/234318
                                    704/E21.02
6,567,779 B1 *   5/2003   Basso .................... H04N 19/61
                                   704/E15.041

(Continued)

FOREIGN PATENT DOCUMENTS

EP         3113180 B1 *   1/2020        ........... G10L 19/005

OTHER PUBLICATIONS

Bzip2, Retrieved from internet: http://www.bzip.org, Retrieved on Jul. 6, 2023, 4 pgs.

(Continued)

*Primary Examiner* — Abderrahim Merouan
(74) *Attorney, Agent, or Firm* — KPPB LLP

(57) ABSTRACT

Systems and method for video communication using text-based compression in accordance with embodiments of the invention are illustrated. One embodiment includes a method for video communication using text-based compression, where the method includes receiving a file comprising captured audio-video content, encoding captured audio-video content to a text transcript using an encoder, trans- (Continued)

mitting initialization data, and the text transcript to a decoder, initializing a facial animation model and a text-to-speech (TTS) system using the initialization data, and reconstructing an animated version of the captured audio-video content using the text transcript, the facial animation model and the TTS system at the decoder.

18 Claims, 6 Drawing Sheets

(51) Int. Cl.
        *G10L 15/26*        (2006.01)
        *H04L 65/403*      (2022.01)

(56)              References Cited

U.S. PATENT DOCUMENTS

| | | | | |
|---|---|---|---|---|
| 6,654,018 | B1 * | 11/2003 | Cosatto | G10L 13/08 |
| | | | | 704/E21.02 |
| 7,844,463 | B2 * | 11/2010 | Basso | G10L 21/06 |
| | | | | 345/473 |
| 11,724,201 | B1 * | 8/2023 | Chaput | A63F 13/424 |
| | | | | 463/31 |
| 2004/0215460 | A1 * | 10/2004 | Cosatto | G06F 16/9577 |
| | | | | 704/260 |
| 2005/0119877 | A1 * | 6/2005 | Basso | H04N 19/46 |
| | | | | 704/E15.041 |
| 2008/0059194 | A1 * | 3/2008 | Basso | H04N 21/4341 |
| | | | | 704/260 |
| 2008/0219636 | A1 * | 9/2008 | Green | G11B 27/034 |
| | | | | 386/245 |
| 2008/0312930 | A1 * | 12/2008 | Basso | G10L 13/00 |
| | | | | 704/E15.045 |
| 2010/0007665 | A1 * | 1/2010 | Smith | G06T 13/40 |
| | | | | 345/473 |
| 2011/0007086 | A1 * | 1/2011 | Kim | G06T 11/001 |
| | | | | 345/581 |
| 2011/0115798 | A1 * | 5/2011 | Nayar | G06T 13/40 |
| | | | | 345/473 |
| 2014/0207451 | A1 * | 7/2014 | Topiwala | G10L 15/32 |
| | | | | 704/235 |
| 2017/0076713 | A1 * | 3/2017 | Gildein, II | H04N 7/15 |
| 2018/0315417 | A1 * | 11/2018 | Flaks | G10L 15/063 |
| 2019/0130917 | A1 * | 5/2019 | Pogorelik | G06F 40/169 |
| 2020/0234483 | A1 * | 7/2020 | Mashrabov | H04L 51/10 |
| 2021/0042393 | A1 * | 2/2021 | Ishikawa | G06F 16/483 |
| 2021/0044640 | A1 * | 2/2021 | He | G10L 15/26 |
| 2021/0110163 | A1 * | 4/2021 | Culbertson | G06V 10/762 |
| 2022/0051463 | A1 * | 2/2022 | Edwards | G10L 15/22 |
| 2023/0223018 | A1 * | 7/2023 | Xing | G10L 15/22 |
| | | | | 704/232 |
| 2024/0031667 | A1 * | 1/2024 | Zou | G06V 20/20 |
| 2024/0220867 | A1 * | 7/2024 | Nunes Coelho, Jr | G06N 5/01 |
| 2024/0321260 | A1 * | 9/2024 | Biswas | G10L 15/16 |

OTHER PUBLICATIONS

Cisco, "Cisco Annual Internet Report (2018-2023) White Paper", Retrieved from internet: https://www.cisco.com/c/en/us/solutions/collateral/executive-perspectives/annual-internet-report/white-paper-c11-741490.html, Retrieved on Jul. 6, 2023, 45 pgs.
Cisco, "Cisco visual networking index: global mobile data traffic forecast update, 2017-2022", Retrieved from internet: https://s3.amazonaws.com/media.mediapost.com/uploads/CiscoForecast.pdf, Date Published—Feb. 2019, 33 pgs.
Descript, "Ultra-realistic voice cloning", Retrieved from internet: https://www.descript.com/overdub, Retrieved on Jul. 10, 2023, 8 pgs.
Google, Google Speech-to-Text, Retrieved from internet: https://cloud.google.com/speech-to-text, Retrieved on Jul. 11, 2023, 9 pgs.

Google, Google Text-to-Speech, Retrieved from internet: https://cloud.google.com/text-to-speech, Retrieved on Jul. 11, 2023, 12 pgs.
Gzip, Retrieved from internet: https://www.gzip.org, Retrieved on Jul. 11, 2023, 1 pg.
Microsoft Azure, "Microsoft Text-to-Speech", Retrieved from internet: https://azure.microsoft.com/en-in/services/cognitive-services/text-to-speech, Accessed in 2021, 7 pgs.
Resemble., Resemble.AI: Create AI Voices that sound real, Retrieved from internet: https://www.resemble.ai, Retrieved on Jul. 11, 2023, 13 pgs.
"Video Streaming Latency Report, WOWZA Media Systems", Retrieved from internet: https://www.wowza.com/wp-content/uploads/Streaming-Video-Latency-Report-Interactive-2020.pdf, Accessed in 2021, 18 pgs.
Baevski et al., "wav2vec 2.0: A Framework for Self-Supervised Learning of Speech Representations", arXiv:2006.11477v3 [cs.CL], Oct. 22, 2020, 19 pgs.
Brandenburg., "MP3 and AAC explained", Audio Engineering Society Conference: 17th International Conference: High-Quality Audio Coding, Sep. 1999, 12 pgs.
Candela et al., "Impact of the COVID-19 pandemic on the Internet latency: A large-scale study", Computer Networks, vol. 182, No. 107495, Dec. 9, 2020, 14 pgs., doi: 10.1016/j.comnet.2020.107495.
Chen et al., "An Overview of Core Coding Tools in the AV1 Video Codec", Picture Coding Symposium (PCS), IEEE, Jun. 1, 2018, pp. 41-45, doi: 10.1109/PCS.2018.8456249.
Chen et al., "From QoS to QoE: A Tutorial on Video Quality Assessment", IEEE Communications Surveys & Tutorials, vol. 17, No. 2, 2015, pp. 1126-1165, doi: 10.1109/COMST.2014.2363139.
Chen et al., "Hierarchical Cross-Modal Talking Face Generation with Dynamic Pixel-Wise Loss", IEEE/CVF Conference Computer Vision and Pattern Recognition (CVPR), arXiv:1905.03820v1 [cs.CV], May 9, 2019, pp. 7824-7833.
Cho et al., "X-LXMERT: Paint, Caption and Answer Questions with Multi-Modal Transformers", Conference on Empirical Methods in Natural Language Processing (EMNLP), arXiv:2009.11278v1 [cs.CV], Sep. 23, 2020, pp. 8785-8805.
Coupe et al., "Different languages, similar encoding efficiency: Comparable information rates across the human communicative niche", Science advances, vol. 5, No. 9, eaaw2594, Sep. 4, 2019, 10 pgs.
Cudeiro et al., "Capture, Learning, and Synthesis of 3D Speaking Styles", IEEE/CVF Conference on Computer Vision and Pattern Recognition, 2019, pp. 10101-10111, doi: 10.1109/CVPR.2019.01034.
De et al., "Impact of digital surge during Covid-19 pandemic: A viewpoint on research and practice", International Journal of Information Management, vol. 51, No. 102171, Dec. 2020, 5 pgs., doi: 10.1016/j.ijinfomgt.2020.102171.
Deng et al., "Disentangled and Controllable Face Image Generation via 3D Imitative-Contrastive Learning", IEEE/CVF Conference on Computer Vision and Pattern Recognition, Jun. 2020, pp. 5154-5163, doi: 10.1109/CVPR42600.2020.00520.
Ford, "COVID-19 and Broadband Speeds: A Multi-Country Analysis", Phoenix Center for Advanced Legal & Economic Public Policy Studie, May 2020, 14 pgs., doi: 10.2139/ssrn.3689044.
Fried et al., "Text-based Editing of Talking-head Video", ACM Transactions on Graphics (TOG), vol. 38, No. 4, Article 68, Jul. 2019, 14 pgs.
Jamaludin et al., "You Said That ?: Synthesising Talking Faces from Audio", International Journal of Computer Vision, vol. 127, No. 11, Feb. 13, 2019, pp. 1767-1779, doi: 10.1007/s11263-019-01150-y.
Karras et al., "Audio-driven facial animation by joint end-to-end learning of pose and emotion", ACM Transactions on Graphics, vol. 36, No. 4, Jul. 20, 2017, pp. 1-12, doi: 10.1145/3072959.3073658.
Kim et al., "TIVGAN: Text to Image to Video Generation With Step-by-Step Evolutionary Generator", IEEE Access, vol. 8, 2020, pp. 153113-153122, doi: 10.1109/ACCESS.2020.3017881.
Leibowicz et al., "The Deepfake Detection Dilemma: A Multistakeholder Exploration of Adversarial Dynamics in Synthetic Media", arXiv:2102.06109v1 [cs.CY], Feb. 11, 2021, 11 pgs.

(56) References Cited

OTHER PUBLICATIONS

Li et al., "Video Generation From Text", Proceedings of the AAAI Conference on Artificial Intelligence, vol. 32, No. 1, Apr. 27, 2018, pp. 7065-7072, doi: 10.1609/aaai.v32i1.12233.

Mansimov et al., "Generating Images from Captions with Attention", arXiv:1511.02793v2 [cs.LG], Feb. 29, 2016, 12 pgs.

Prabhakar et al., "Reducing latency and bandwidth for video streaming using keypoint extraction and digital puppetry", arXiv:2011.03800v2 [eess.IV], Jan. 8, 2021, 11 pgs.

Prajwal et al., "A Lip Sync Expert Is All You Need for Speech to Lip Generation in the Wild", MM '20: Proceedings of the 28th ACM International Conference on Multimedia, 2020, pp. 484-492, doi: 10.1145/3394171.3413532.

Prajwal et al., "Towards Automatic Face-to-Face Translation", Proceedings of the 27th ACM International Conference on Multimedia, 2019, pp. 1428-1436, doi: 10.1145/3343031.3351066.

Ramesh et al., "Zero-Shot Text-to-Image Generation", arXiv:2102.12092v2 [cs.CV], Feb. 26, 2021, 20 pgs.

Siarohin et al., "First Order Motion Model for Image Animation", 33rd Conference on Neural Information Processing Systems, vol. 32, No. 641, 2019, pp. 7137-7147.

Suwajanakorn et al., "Synthesizing Obama: Learning Lip Sync from Audio", ACM Transactions on Graphics, vol. 36, No. 4, Article 95, Jul. 20, 2017, pp. 1-13, doi: 10.1145/3072959.3073640.

Taylor et al., "A Deep Learning Approach for Generalized Speech Animation", ACM Transactions on Graphics, vol. 36, No. 4, Article 93, Jul. 20, 2017, pp. 1-11, doi: 10.1145/3072959.3073699.

Thies et al., "Neural Voice Puppetry: Audio-driven Facial Reenactment", European Conference on Computer Vision, Lecture Notes in Computer Science, vol. 12361, Springer, 2020, pp. 716-731, doi: 10.1007/978-3-030-58517-4_42.

Vaccari et al., "Deepfakes and Disinformation: Exploring the Impact of Synthetic Political Video on Deception, Uncertainty, and Trust in News", Social Media + Society, vol. 6, No. 1, 2020, 13 pgs., doi: 10.1177/2056305120903408.

Wang et al., "3D-TalkEmo: Learning to Synthesize 3D Emotional Talking Head", arXiv:2104.12051v1 [cs.CV], Apr. 25, 2021, 10 pgs.

Wang et al., "One-Shot Free-View Neural Talking-Head Synthesis for Video Conferencing", Conference on Computer Vision and Pattern Recognition (CVPR), arXiv:2011.15126v3 [cs.CV], Apr. 2, 2021, 16 pgs.

Wang et al., "Video-to-Video Synthesis", arXiv:1808.06601v2 [cs.CV], Dec. 3, 2018, 14 pgs.

Weissenborn et al., "Scaling Autoregressive Video Models", International Conference on Learning Representations, arXiv:1906.02634v3 [cs.CV], Feb. 10, 2020, 24 pgs.

Wiegand et al., "Overview of the H.264/AVC video coding standard", IEEE Transactions on circuits and systems for video technology, vol. 13, No. 7, Jul. 2003, pp. 560-576, doi: 10.1109/TCSVT.2003.815165.

Zakharov et al., "Fast Bi-layer Neural Synthesis of One-Shot Realistic Head Avatars", European Conference on Computer Vision, Lecture Notes in Computer Science, vol. 12357, Springer, 2020, pp. 524-540, doi: 10.1007/978-3-030-58610-2_31.

Zhou et al., "MakeItTalk: Speaker-Aware Talking-Head Animation", ACM Transactions on Graphics, vol. 39, No. 6, arXiv:2004.12992v3 [cs.CV], Feb. 25, 2021, pp. 1-15.

Zhou et al., "VisemeNet: Audio-Driven Animator-Centric Speech Animation", ACM Transactions on Graphics, vol. 37, No. 4, Article 161, Aug. 2018, pp. 1-10, doi: 10.1145/3197517.3201292.

* cited by examiner

400

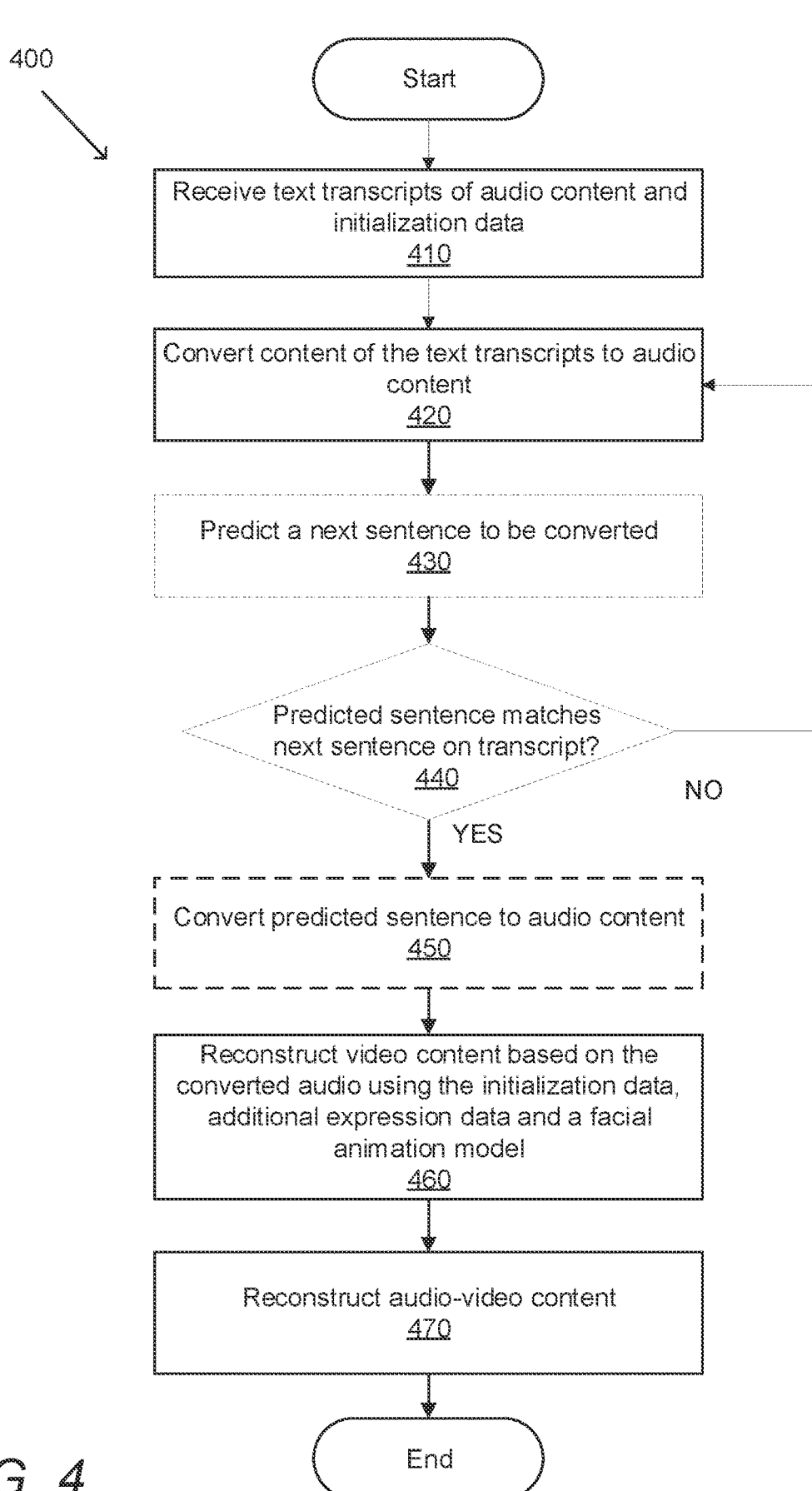

Start

Receive text transcripts of audio content and
initialization data
410

Convert content of the text transcripts to audio
content
420

Predict a next sentence to be converted
430

Predicted sentence matches
next sentence on transcript?
440

YES

NO

Convert predicted sentence to audio content
450

Reconstruct video content based on the
converted audio using the initialization data,
additional expression data and a facial
animation model
460

Reconstruct audio-video content
470

End

*FIG. 4*

SYSTEMS AND METHODS FOR PERFORMING VIDEO COMMUNICATION USING TEXT-BASED COMPRESSION

CROSS-REFERENCE TO RELATED APPLICATIONS

The current application claims the benefit of and priority under 35 U.S.C. § 119(e) to U.S. Provisional Patent Application No. 63/214,195 entitled "Txt2Vid: Ultra-Low Bitrate Compression of Talking-Head Videos via Text" filed Jun. 23, 2021. The disclosure of U.S. Provisional Patent Application No. 63/214,195 is hereby incorporated by reference in its entirety for all purposes.

FIELD OF THE INVENTION

The present invention generally relates to network communication and, more specifically, audio-video communication over the internet.

BACKGROUND

Video conferencing refers to the real-time transmission and reception of audio and video signals by multiple participants in different locations in order to facilitate communication between the participants. Video conferencing generally involves the use of a video camera and a video display for the visual aspects of the communication, and a speaker and a microphone for the audio aspects of the communication. Video conferencing often relies on the Internet and/or other types of network connection for the transmission of reception of audio and video signals, where bandwidth of said connection may affect the quality of transmission and reception of signals.

Video compression is a process to reduce the size of video files that are transmitted. Compression of video content allows for a reduction in the amount of storage needed to store video content. Compressed videos also require less connection bandwidth to be transmitted from one source to the other over a network connection, which in turn can provide better user experiences when participants access the transmitted media.

SUMMARY OF THE INVENTION

Systems and methods for performing video communication using text-based compression in accordance with embodiments of the invention are illustrated. One embodiment includes a method for video communication using text-based compression, where the method includes receiving a file comprising captured audio-video content. The method further includes encoding captured audio-video content to a text transcript using an encoder, and transmitting initialization data, and the text transcript to a decoder. The method further includes initializing a facial animation model and a text-to-speech (TTS) system using the initialization data, and reconstructing an animated version of the captured audio-video content using the text transcript, the facial animation model and the TTS system at the decoder.

In another embodiment, the method further includes extracting audio from captured audio-video content, and converting the extracted audio to a text transcript.

In a further embodiment, the method further includes a method for converting extracted audio to a text transcript using at least one method from the group consisting of an automatic speech recognition method, and a speech-to-text method.

In still another embodiment, the method further includes converting a text transcript to audio using a TTS system.

In a still further embodiment, the method further includes training a facial animation model with initialization data, reconstructing video content of the converted audio being spoken using the converted audio and the facial animation model, and combining reconstructed video with converted audio.

In yet another embodiment, the initialization data includes a video clip of a participant speaking that identifies facial movements of the participant.

In a yet further embodiment, the initialization data further includes a set of variables for parameterizing a facial animation model, and additional expression data for animating expressions of the facial animation model.

In another additional embodiment, the text transcript is streamed to receiving devices for real time decoding and reconstructing of audio-video content.

In a further additional embodiment again, the decoder can be incorporated into a video player as part of a video conferencing application.

In another embodiment again, the decoder can be incorporated into a video player as part of a live streaming video application.

One embodiment includes a method for video communication using text-based transmission, where the method includes receiving a text input transmitted from a terminal at an encoder. The method further includes transmitting initialization data, additional expression data, and the text input to a decoder, and packaging the text input and transmitted initialization data at the decoder, initializing a facial animation model and a text-to-speech (TTS) system using the initialization data, and reconstructing an animated version of audio-video content based on the text input using the additional expression data, the text input, the facial animation model and the TTS system at the decoder.

One embodiment includes a video communication system, including a first personal device, including an encoder configured to receive a file comprising captured audio-video content, encode captured audio-video content to a text transcript using an encoder, and transmit initialization data, the text transcript to a decoder, and including a second personal device. The system further includes a decoder configured to initialize a facial animation model and a text-to-speech (TTS) system using the initialization data, and reconstruct an animated version of the captured audio-video content using the facial animation model and the TTS system at the decoder.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 4 is a flow chart of a process for reconstructing compressed audio-video content in accordance with an embodiment of the invention.

DETAILED DESCRIPTION

Figure 1:
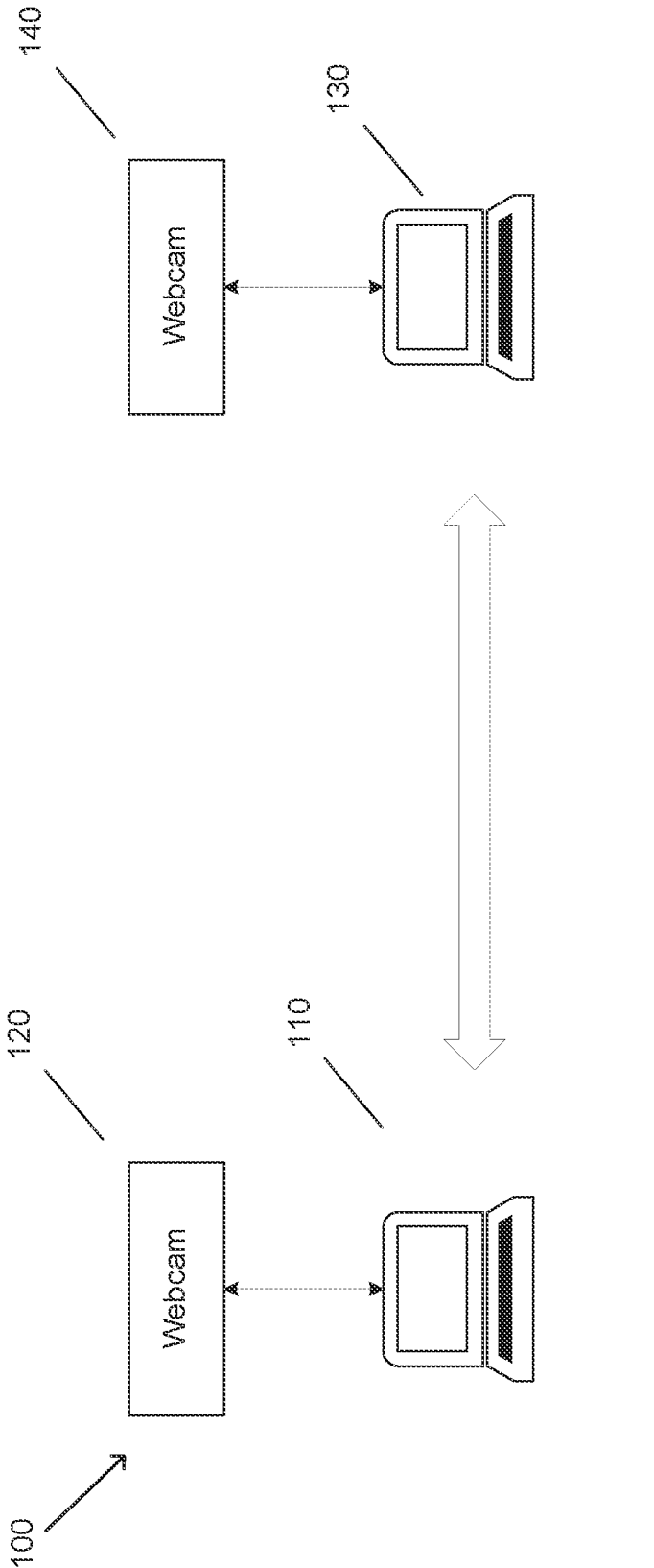
FIG. 1 illustrates a video communication system using text-based compression of video streams in accordance with an embodiment of the invention.

Video conferencing has become a vital modern communication modality for both commercial and private purposes. However, video conferencing requires large amounts of data to be transmitted between the conference participants. When bandwidth is low or changing, the quality of audio-video signals transmitted and received may reduce drastically. In worse situations, transmission and reception of audio-video signals may halt intermittently, and the participants' quality of experience can suffer because of the interruptions. As more people make the transition to holding meetings over the Internet, better methods for video conferencing that would be less affected by changes in bandwidth have become more necessary than ever. Further, while many developed areas have relatively reliable, high-bandwidth infrastructure, there are many areas which do not.

Systems and methods described herein attempt to remedy these problems by significantly reducing the amount of bandwidth needed for a video conference. In numerous embodiments, video conferencing systems described herein only transmit text transcripts, and optionally a relatively small amount of initialization data, rather than a constant video stream. As text data is significantly smaller than video data, and is also very compressible, much less bandwidth is used. Further, initialization data can be used to reconstruct a facsimile of a presenter which is synchronized to a realistic reproduction of their voice speaking the transmitted text. In many embodiments, this is achieved using specialized encoders and decoders capable of compressing and de-compressing original audio-video content.

In many embodiments, encoders can compress audio-video content for transmission by extracting audio content and converting the audio content to text transcripts. In several embodiments, the extracted audio content may be speech spoken by humans. Content transmitted in the course of a video conference may effectively be text transcripts of the participants in certain embodiments of the invention, and this does not require a high bandwidth to be performed. In some embodiments, additional expression data can be transmitted along with the text transcript, where the expression data includes timestamped sections associated with a particular emotion such that decoder can recreate the expression in association with that speech. Expression data can include visual cues of a participant, for example, eyelid movements, eyebrow movements, micro expressions, head movements, facial expressions, gestures, and/or any other visual cue as appropriate to the requirements of specific applications of embodiments of the invention. In various embodiments, the expression data is provided as metadata to the text transcript. In numerous embodiments, the expression data is used to recreate similar visual cues in the reconstructed audio video content.

In many embodiments, decoders reconstruct the compressed audio-video content. In certain embodiments, the decoder reconstructs audio content based on the received text transcripts. Processes in accordance with selected embodiments of the invention may include transmitting initialization data to the decoder. In numerous embodiments, the initialization data is a driving video. In a number of embodiments, the driving video may be a short video of the participant performing facial movements. The driving video can be agnostic to the content that is being decoded, and can identify facial keypoints of the participant in accordance with several embodiments of the invention. In many embodiments, the decoder may reconstruct video content by applying the driving video and the reconstructed audio content to a facial animation model. In several embodiments, the system may combine the reconstructed audio and video to reproduce pre-compression audio-video content. In certain embodiments, participants can enter text in a terminal at a communication device. Text inputs may also be reconstructed into audio-video content in manner described above. The overall process in many embodiments requires a very limited amount of bandwidth.

An example system of video communication using text-based compression in accordance with many embodiments of the invention is illustrated in FIG. 1. System 100 may include communication devices 110 and 130. In many embodiments, communication devices 110 and 130 are connected to webcams 120 and 140. Webcams 120 and 140 can capture participants' speech and movements in a video conference. Content captured by webcams 120 and 140 can be stored in memories of communication devices 110 and 130. In numerous embodiments, captured content includes audio content and video content.

In a number of embodiments, encoders and decoders described herein that perform text-based compression are stored in memories on communication devices 110 and 130. System configuration illustrated in FIG. 1 may be utilized in situations where available network bandwidths are low for all participants, allowing encoding to be performed before transmission, and decoding to be performed after reception. In some embodiments, encoding and decoding of compressed video content may be performed on off-site servers connected to remotely by communication devices 110 and 130. Content captured by webcams 120 and 140 may be fed as inputs to encoders stored in memories on communication devices 110 and 130. In several embodiments, encoders convert captured content to text transcripts by extracting audio content from the captured content. Encoders may apply either an automatic speech recognition (ASR) system, a speech-to-text (STT) system, or a manual transcription to convert audio content to text transcripts. Encoders in accordance with embodiments of the invention output text transcripts to communication devices of other participants, which may be either communication devices 110 or 130 as illustrated in FIG. 1.

Upon reception of the text transcripts, either communication devices 110 or 130 may reconstruct the captured content based on the text transcripts. In many embodiments, text transcripts are converted back to audio using a text-to-speech (TTS) system accessible through an application programming interface (API). System 100 utilizes initialization data to train a facial animation model. In numerous embodiments, the initialization data is a driving video of the participant. The driving video may be very short in length and agnostic to the content that is being decoded, but can identify the facial keypoints and facial movements of the participant. In some embodiments, the facial animation model can be trained offline with initialization data of one participant or a group of participants. Initialization data may include typical facial cues. Decoders can combine the facial animation model trained with the participant's initialization data and the converted audio content to reconstruct a facsimile video content of the participant speaking the words that they have already spoken. In some embodiments, driving video may be fed to a machine learning model to initialize it, and a log of the machine learning model state can be saved and transmitted at lower bandwidth relative to the transmission of the driving video. The log can then be used to initialize a copy of the same model instead of the driving video. Similarly, initialization data may include audio clips of a subject speaking in order to initialize a text-to-speech model, or image data to assist in the reconstruction of a background scene. As can readily be appreciated, initialization data may include any number of separate data used to initialize various portions of the decoder as discussed below. Embodiments of the invention can reduce bandwidth usage in transmission of video communication by effectively only transmitting text transcripts instead of entire video streams.

Figure 2:
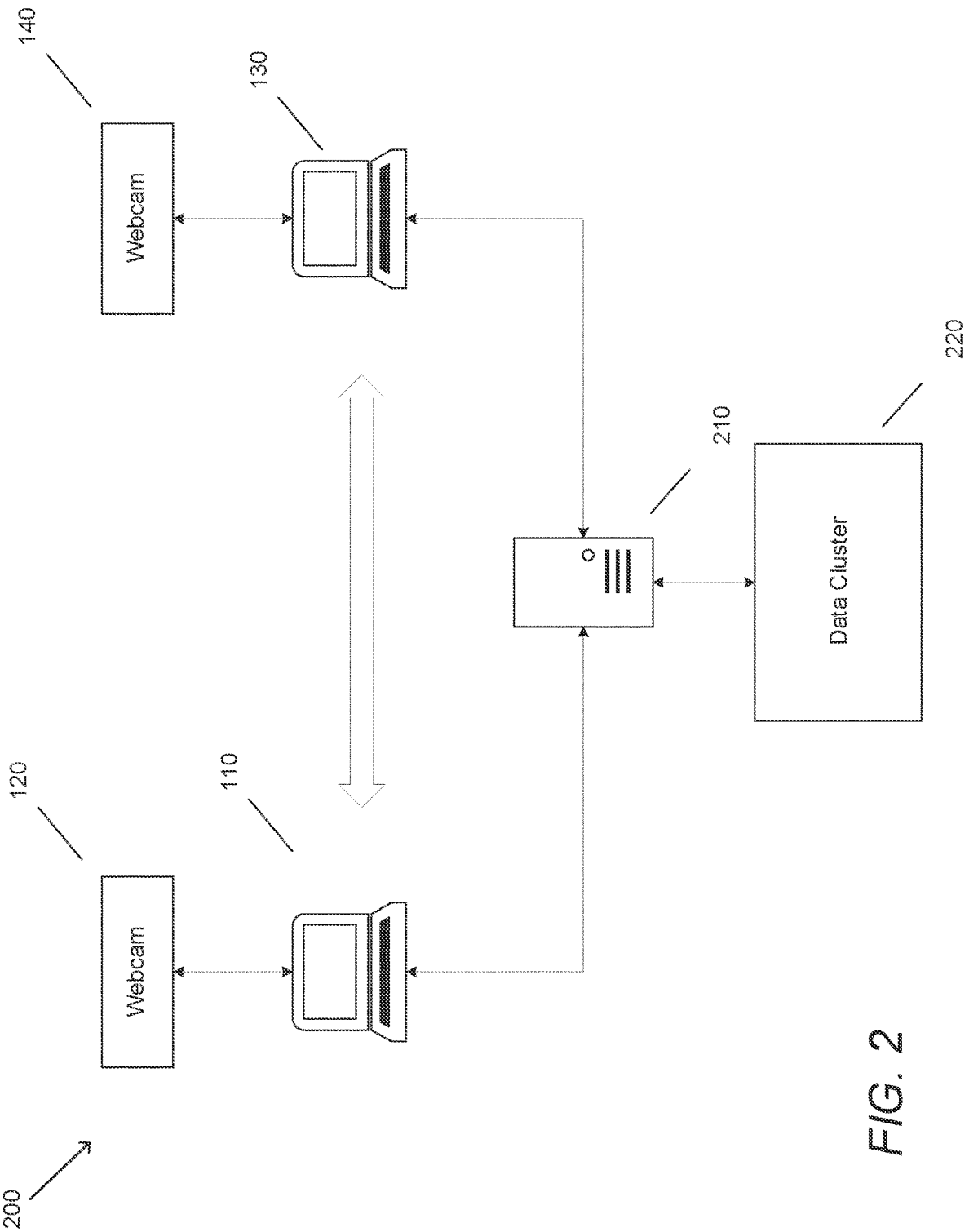
FIG. 2 illustrates a video communication system using text-based compression of video streams with an off-site server in accordance with an embodiment of the invention.

When available network bandwidths are not low for all participants, the system may be configured as illustrated in FIG. 2. In many embodiments, system 200 includes communication devices 110 and 130, webcams 120 and 140, and server 210. Server 210 may be a single server, or a group of servers. In several embodiments, decoders are stored in server 210 to reconstruct transmitted content. Reconstructed content may be sent from server 210 to receiving participants. Servers generally possess higher computing power than a participant's communication device, therefore, for participants on the receiving end of a video conference who do not have limitations on available network bandwidth, system configuration illustrated in FIG. 2 may provide better quality of experience (QoE). Decoders stored in server 210 may reconstruct transmitted content in a higher quality to be sent to receiving participants.

In several embodiments, server 210 contains data cluster 220. System perform processes in accordance with embodiments of the invention based on the available data in data cluster 220. In certain embodiments where participants' communication devices communicate with each other without a server, data cluster 220 may still be accessible using a network connection.

As can readily be appreciated the specific computing system used to perform video communication using text-based compression is largely dependent upon the requirements of a given application and should not be considered as limited to any specific computing system(s) implementation. Further, even in low-bandwidth scenarios, connections between communication devices may be mediated via one or more servers or other networking devices as appropriate to the requirements of specific applications of embodiments of the invention. Encoders and decoders are discussed in further detail below.

Encoding

Figure 3:
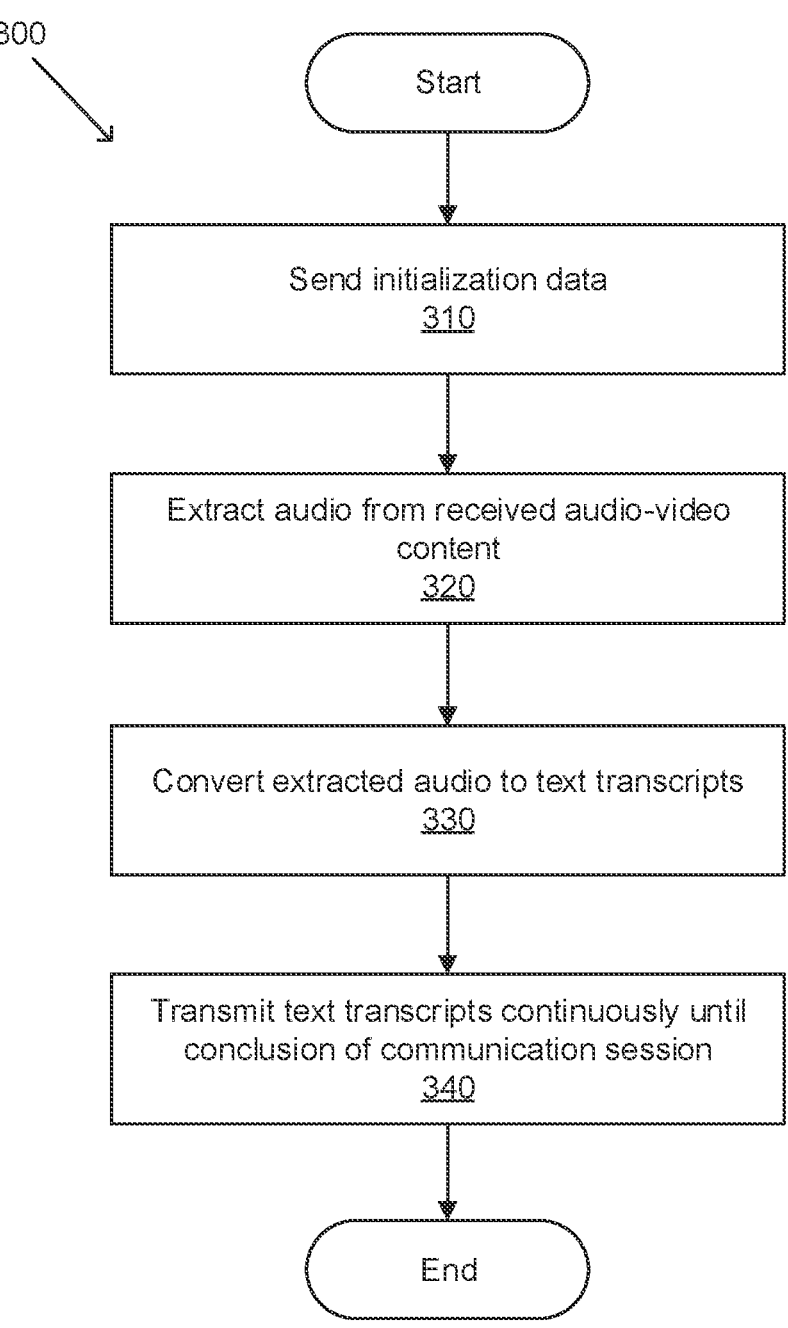
FIG. 3 is a flow chart of a process for encoding audio-video content using text-based compression in accordance with an embodiment of the invention.

Encoders as described herein can generate a text script from speech audio in near real time, and package it for transmission to a decoder. In various embodiments, encoders are also capable of generating initialization data from audio and/or video. Initialization data may be used to initialize one or more machine learning models, either at the decoder or the encoder. In various embodiments, the encoder can compress text and/or initialization data for transmission. A process for encoding audio-video content using text-based compression in accordance with embodiments of the invention is illustrated in FIG. 3.

Process 300 sends (310) initialization data to the decoders. As mentioned above, initialization data may be used at the decoder to train a facial animation model for reconstruction of video content. In numerous embodiments, initialization data is unique to the particular participant. In several embodiments, initialization data can be a driving video of the participant. The driving video may be a video extracted from the captured audio-video content when the audio-video content was captured under high bandwidth conditions, and may be used under low bandwidth conditions. In some embodiments, driving video is a pre-recorded video of the participant that needs to only be sent once to train the facial animation model. Since initialization data only needs to be transmitted once to train the model, transmission of initialization data may be considered to be negligible in bandwidth usage in the overall scheme of communication.

Process 300 extracts (320) audio content from captured audio-video content. Process 300 converts (330) extracted audio content to text transcripts. In many embodiments, conversion to text transcripts is accomplished with an automatic speech recognition (ASR) system, and/or a speech-to-text (STT) system, and/or manual transcription. In several embodiments, converted text transcripts can be further compressed using standard compressors such as gzip or bzip2 to further reduce the file size for ease of transmission. Participants may also directly enter text for transmission and reconstruction through a terminal on their communication devices. Process 300 transmits (340) text transcripts continuously to the decoder until the conclusion of the communication session.

Depending on participants' available network bandwidths, text transcripts are generated offline in a number of embodiments. Decoders can act as a video player that plays the reconstructed content after decoding is complete. In some embodiments, the decoder can be incorporated into a video player as part of a video conferencing application and/or a live streaming video application. Receiving devices may store the content in memory after reconstruction. In several embodiments, text transcripts are streamed to receiving devices, where encoding and decoding are performed real time. Latency in the encoding and decoding process may be allowed under this configuration to cater to possible network latency in streaming. In some embodiments, text transcripts are streamed real time, and latency in the decoding and encoding process is less permissible. Embodiments of the invention where latency is less permissible can be used in interactive real-time communication tools such as video conferencing applications.

While specific processes for encoding audio-video content using text-based compression are described above, any of a variety of processes can be utilized to encoding audio-video content using text-based compression as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Decoding and Reconstructing

Decoders as described herein can convert text transcripts to speech audio in near real time, and use the converted audio to reconstruct video content of the audio being spoken. In selected embodiments, decoders are also capable of predicting a next sentence that might be on the text transcript. A process for reconstructing compressed audio-video content in accordance with embodiments of the invention is illustrated in FIG. 4. In several embodiments, decoding process may be performed by a decoder stored in a participant's communication device. In some embodiments, decoding process may be performed by a decoder stored in a server independent from participants' communication devices.

Process 400 receives (410) compressed text transcripts of audio content and initialization data. Process 400 converts (420) content from the compressed text transcripts to audio content. In many embodiments, text content is converted to audio content using a TTS system. TTS functionality may be provided via a third-party system, which may be offsite and accessible by an API, or any other TTS system capable of operating in near-real time. TTS functionality may also be implemented at the decoder or on a first-party server. In some embodiments, TTS systems are calibrated to produce audio in the voice of the participant who generated the initial encoded content. Calibrated TTS systems may be able to reconstruct audio that are more accurate in its pitch and tone. Frequent participants of the communication system may provide more training data of them speaking to calibrate the TTS systems such that audio reconstruction becomes increasingly accurate with more usage.

Decoders in accordance with embodiments of the invention can leverage TTS systems to translate spoken audio content. In certain embodiments, decoders can receive text transcripts of audio content spoken in one language, e.g. English, and translate text in English to another language, e.g. Chinese. In this example scenario, decoders may convert the translated text transcripts to audio in Chinese using TTS systems that is capable of reconstructing voices speaking in Chinese. Choices of languages to translate to and from are not limited to the ones disclosed. In numerous embodiments, the decoder can provide for additional real time translation in video communication situations such as webinars.

Process 400 can predict (430) a next sentence to be converted. In many embodiments, content on the text transcripts are converted into audio content on a sentence-by-sentence basis. Each sentence on the text transcripts may be converted based on a queue of sentences. While waiting for a next sentence to be converted, the decoder can predict a next sentence that will be converted using a predictive text model in accordance with some embodiments of the invention. The predicted next sentence may be based on the already-converted text transcript and/or the TTS system calibrated to the participant. In a variety of embodiments, the generated predicted sentence is in the form of audio content. In several embodiments, the decoder compares the generated predicted sentence with the actual next sentence. The decoder may determine (440) whether the generated predicted sentence matches the actual next sentence. In some embodiments, the decoder converts (450) generated predicted sentence to audio if it matches the actual next sentence. The decoder may return to normal conversion operation (420) if the generated predicted sentence does not match the actual next sentence. In certain embodiments, decoders can save computational resources by reducing the amount of text to audio conversion that needs to be performed. Decoders may reduce latency, as the decoding process can be launched before actual communication data is received.

Process 400 reconstructs (460) video content based on the converted audio using the initialization data and a facial animation model. In many embodiments, facial animation models can animate faces to produce effects such as but not limited to a lip-syncing effect. Facial animation models may animate any other facial expressions in accordance with embodiments of the invention. In selected embodiments, facial animation models can include lip-sync models. Facial animation models in accordance with numerous embodiments of the invention are trained with initialization data. As discussed above, initialization data may be a driving video of the participant that identifies facial keypoints of the participant. Initialization data may contain a "User ID" that designates the data to a particular participant. Initialization data may be sent to the decoder prior to the transmission of video communication to train the facial animation model, and initialization data needs to only be sent once for a designated participant in many embodiments of the invention. In several embodiments, facial animation models are able to use reconstructed audio content and produce video content of the participant that accurately mimics how the participant's facial features would move when speaking the audio content based on the initialization data. In certain embodiments, additional expression data can be transmitted along with the text transcript, where the expression data includes timestamped sections associated with a particular emotion such that decoder can recreate the expression in association with that speech. Expression data can include visual cues of a participant, for example, eyelid movements, eyebrow movements, micro expressions, head movements, facial expressions, gestures, and/or any other visual cue as appropriate to the requirements of specific applications of embodiments of the invention. In many embodiments, the expression data is provided as metadata to the text transcript. In selected embodiments, the expression data is used to recreate similar visual cues in the reconstructed audio video content. Additionally, on platforms with less computing power, embodiments of the invention may attempt to alleviate computational load on participants' communication devices by reducing the number of frames in the reconstructed video content.

In many embodiments, models including at least the facial animation model and the TTS model are trained at a server. The server may train the facial animation model with received initialization data. In some embodiments, the facial animation model and the TTS model are stored on different servers. The trained facial animation model and the TTS model are accessible remotely by participants' communication devices in accordance with embodiments of the invention. In several embodiments, training of models is performed on participants' communication devices where no server is required as an intermediary.

Process 400 reconstructs (470) audio-video content using the reconstructed audio content and video content. In many embodiments, the system can reconstruct the original audio-video content with only transmitting text transcripts, which only requires approximately 100 bps of available bandwidth. In several embodiments, the system reconstructed audio-video content using an average of 85 bps of available bandwidth. Compressed content may be 100 to 1000 times smaller than the original audio-video content. In certain embodiments, available bandwidth for each participant's communication device is measured and processes can perform each step in a manner that is optimal based on available network bandwidths of the different devices.

While specific processes for decoding compressed audio-video content are described above, any of a variety of processes can be utilized to decode compressed audio-video content as appropriate for the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to decoding compressed audio-video content, the techniques disclosed herein may be used in any type of text-based decoding, including a transmission method where only audio content is reconstructed and no video content is reconstructed.

Figure 5:
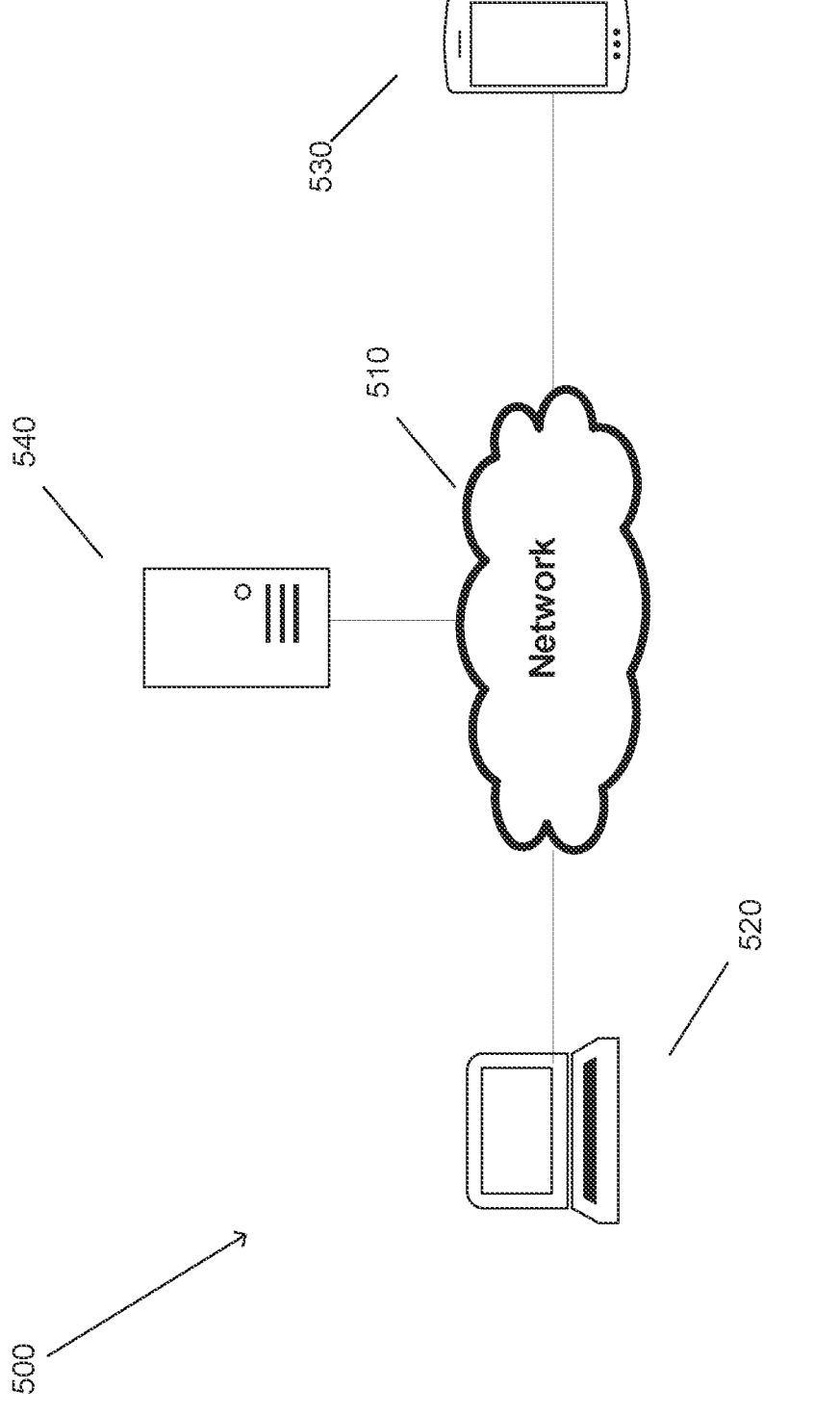
FIG. 5 is an example system architecture for performing video communication using text-based compression in accordance with an embodiment of the invention.

An example system architecture for performing video communication using text-based compression in some embodiments of the invention is illustrated in FIG. 5. In many embodiments, network 500 includes a communication network 510. Communication network 510 may be a network such as the Internet that allows communication devices and/or servers connected to the network 510 to communicate with other connected devices.

Participants may use communication devices that connect to the network 510 to perform processes that perform video communication using text-based compression of video stream in accordance with various embodiments of the invention. In the shown embodiment, the communication devices are shown as laptop 520 and smart phone 530 that are connected to the network 510. Communication devices may connect to network 510 via a conventional "wired" connection or a wireless connection. A wireless connection may be a connection that uses Radio Frequency (RF) signals, Infrared signals, or any other form of wireless signaling to connect to the network 510. Communication devices may be desktop computers, a laptop computers, smart televisions, gaming consoles, tablet computers, or any other device that connects to the network 510 without departing from this invention.

In a number of embodiments, server 540 can be connected to the network 510. According to various embodiments of the invention, server 540 may be a group of one or more servers communicatively connected to one another via internal networks that execute processes that provide cloud services to participants over the network 510. For purposes of this discussion, cloud services are one or more applications that are executed by one or more server systems to provide data and/or executable applications to devices over a network. In some embodiments, server 540 may only be a single server that is connected to network 510 to provide services to participants. In accordance with various embodiments of this invention, a computing system that uses systems and methods that perform video communication using text-based compression in accordance with an embodiment of the invention may be provided by a process being executed on a single server system and/or a group of server systems communicating over network 510.

Figure 6:
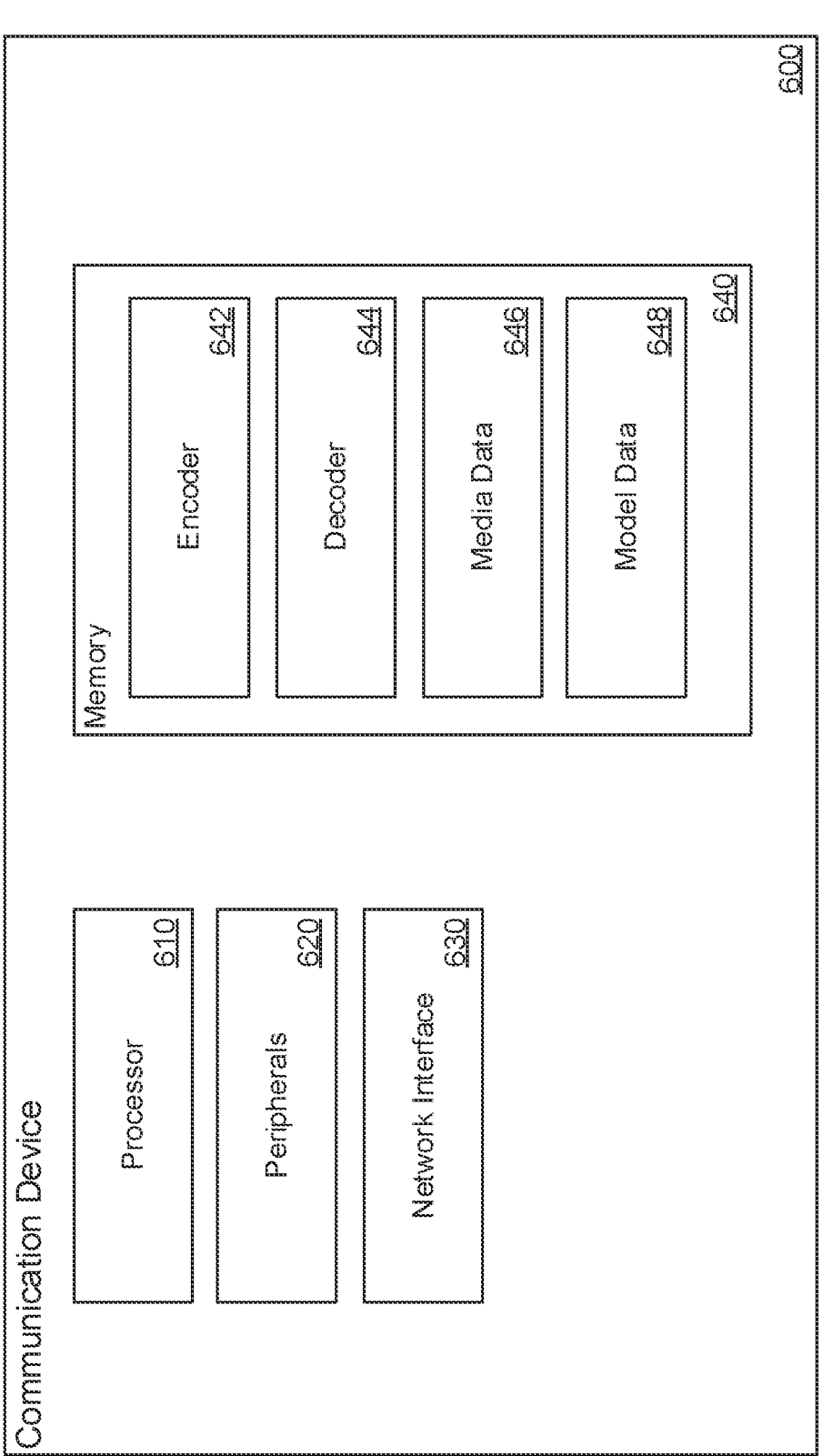
FIG. 6 is a high-level block diagram of a communication device for performing video communication using text-based compression to be implemented on in accordance with an embodiment of the invention.

An example of a communication device where processes for performing video communication using text-based compression of talking head videos can be implemented in some embodiments of the invention is illustrated in FIG. 6.

Communication device 600 includes a processor 610. Processor 610 may direct the encoder 642 to encode and compress original audio-video content in accordance with several embodiments of the invention. Processor 610 may direct the decoder 644 to decode and reconstruct compressed audio-video content in accordance with several embodiments of the invention. In many embodiments, processor 610 can include a processor, a microprocessor, controller, or a combination of processors, microprocessor, and/or controllers that performs instructions stored in the memory 640 to manipulate encoded original audio-video content. Processor instructions can configure the processor 610 to perform processes in accordance with certain embodiments of the invention. In various embodiments, processor instructions can be stored on a non-transitory machine readable medium. Peripherals 620 may be used by participants to control encoded content. Communication device 600 further includes a network interface 630 that can receive original audio-video content of participants in a video conference, and a memory 640 to store the audio-video content under a media data memory 646. In many embodiments, stored content are text transcripts. In certain embodiments, the decoder 644 is also a video player. In some embodiments, a facial animation model may be stored in model data 648 in the memory 640.

In numerous embodiments, communication device 600 performs processes disclosed above in a bidirectional manner where it may transmit and receive audio-video content simultaneously in real time. In selected embodiments, specific devices may operate only as an encoder or decoder to perform the processes disclosed above. While a particular communication device having both an encoder and a decoder is illustrated in FIG. 6, in various embodiments communications devices may only incorporate either an encoder or a decoder. One skilled in the art will recognize that the communication device may exclude certain components and/or include other components that are omitted for brevity without departing from this invention.

Although a specific example of a communication device is illustrated in this figure, any of a variety of transmitting elements can be utilized to encode audio-video content similar to those described herein as appropriate to the requirements of specific applications in accordance with embodiments of the invention.

Although specific methods of video communication using text-based compression are discussed above, many different methods of video communication using text-based compression can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A method for video communication using text-based compression, the method comprising:
receiving, at a first video communications device, a video of a participant speaking that identifies facial movements of the participant;
transmitting initialization data comprising the received video to a second video communications device;
training, at a decoder of the second communications device using the initialization data, a facial animation model unique to the participant to generate an animated version of the participant, where the animated model movements recreate the facial movements of the participant, and where the facial animation model is a machine learning model;

capturing, during a video conference, audio-video content of the participant speaking using a camera of the first video communications device;

encoding the captured audio-video content to a text transcript using an encoder of the first video communications device;

streaming the text transcript to the second video communications device;

initializing, using the second video communications device, the facial animation model and a text-to-speech (TTS) system; and reconstructing, using a decoder of the second video communications device, an animated version of the captured audio-video content as part of the video conference, using the text transcript, the facial animation model and the TTS system at the decoder.

2. The method of claim 1, where encoding captured audio-video content comprises:

extracting audio from captured audio-video content; and converting extracted audio to a text transcript.

3. The method of claim 2, where converting extracted audio to the text transcript uses at least one method from the group consisting of:

an automatic speech recognition method; and a speech-to-text method.

4. The method of claim 1, where reconstructing an animated version of the captured audio-video content comprises converting the text transcript to audio using the TTS system.

5. The method of claim 1, where reconstructing an animated version of the captured audio-video content further comprises:

generating reconstructed audio of the text transcript using the TTS system;

generating reconstructed video of an animated head based on the participant speaking the reconstructed audio using the facial animation model; and combining the reconstructed video with the reconstructed audio.

6. The method of claim 1, where initialization data further comprises:

a set of variables for parameterizing the facial animation model; and additional expression data for animating expressions of the facial animation model.

7. The method of claim 1, where the text transcript is streamed to receiving devices for real time decoding and reconstructing of audio-video content.

8. The method of claim 1, where the decoder is incorporated into a video player as part of a video conferencing application.

9. The method of claim 1, further comprising further generating, using the decoder of the second video communications device, a predicted version of captured audiovisual content not yet received by the second video communications device by providing predictive text to the decoder based upon the received text transcript.

10. A video communication system, comprising:

a first communications device configured to:

receive, at a first video communications device, a video of a participant speaking that identifies facial movements of the participant;

transmit initialization data comprising the received video to a second video communications device;

receive a stream of captured audio-video content of the participant speaking from a camera of the first communications device during a video conference;

encode the stream of captured audio-video content to a text transcript using an encoder; and stream the text transcript to the second communications device; and the second communications device configured to:

train, using a decoder and the initialization data, a facial animation model unique to the participant to generate an animated version of the participant, where the animated model movements recreate the facial movements of the participant, and where the facial animation model is a machine learning model;

initialize a facial animation model and a text-to-speech (TTS) system; and reconstruct, using the decoder, an animated version of the captured audio-video content as part of the video conference using the text transcript, the facial animation model and the TTS system at the decoder.

11. The system of claim 10, where the encoder is further configured to:

extract audio from captured audio-video content; and convert extracted audio to a text transcript.

12. The system of claim 11, where encoder is further configured to convert extracted audio to the text transcript using at least one method from the group consisting of:

an automatic speech recognition method; and a speech-to-text method.

13. The system of claim 10, where the decoder is further configured to convert the text transcript to audio using the TTS system.

14. The system of claim 10, where the decoder is further configured to:

generate reconstructed audio of the text transcript using the TTS system;

generate reconstructed video of an animated head based on the participant speaking the reconstructed audio using the facial animation model; and combine the reconstructed video with the reconstructed audio.

15. The system of claim 10, where initialization data further comprises:

a set of variables for parameterizing the facial animation model; and additional expression data for animating expressions of the facial animation model.

16. The system of claim 10, where the text transcript is streamed to receiving devices for real time decoding and reconstructing of audio-video content.

17. The system of claim 10, where the decoder is incorporated into a video player as part of a video conferencing application.

18. The system of claim 10, wherein the second communications device is further configured to generate a predicted version of captured audio-visual content not yet received by the second video communications device by providing predictive text to the decoder based upon the received text transcript.

* * * * *